Feb. 14, 1961 H. S. V. JÄRUND 2,971,565
COUNTER-PRESSURE JAW
Filed Jan. 23, 1957 2 Sheets-Sheet 1
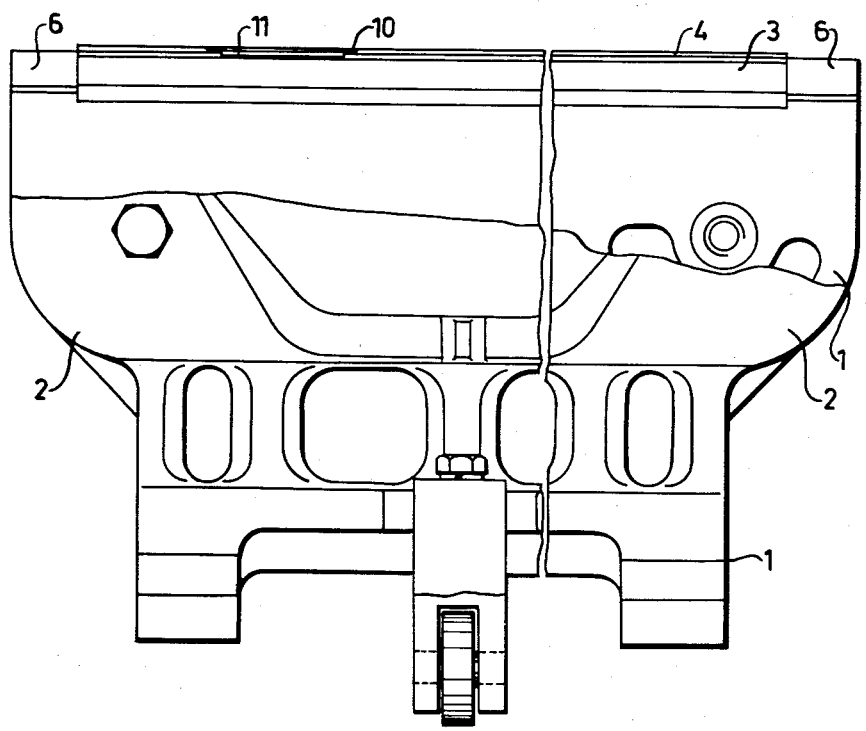
Fig. 1
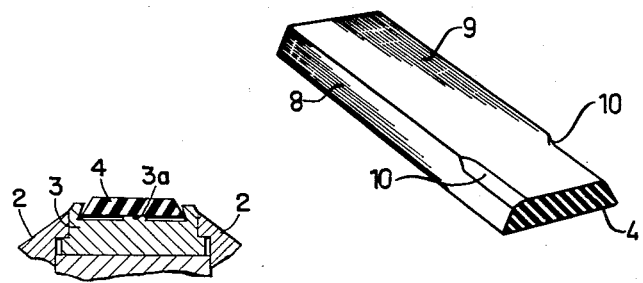
Fig. 3
Fig. 4

United States Patent Office 2,971,565
Patented Feb. 14, 1961

2,971,565

COUNTER-PRESSURE JAW

Harry Sigurd Valdemar Järund, Otto Lindblads vag 18, Lund, Sweden

Filed Jan. 23, 1957, Ser. No. 635,726

Claims priority, application Sweden Jan. 25, 1956

3 Claims. (Cl. 154—42)

The present invention relates to a device in clamping jaws, particularly in counter-pressure jaws in machines for continuous production of an unbroken string of packages through compressing a tube of flexible material and heat-sealing the latter or an interior tube coating along zones at equal distances from each other and transverse in relation to the longitudinal direction of the tube.

When manufacturing packages from a tube by compressing the latter at points at a distance from each other transversely along the longitudinal extension of the tube, it has been connected with certain difficulties to obtain a positively tight transverse joint, as fine channels may occur along the transverse joint, particularly if the tube is of a fibrous material, which at the inside of the tube is provided with an impermeable heat-sealable coating for example a plastic. As a rule each of the counter-pressure jaws is co-operable with an individual clamping jaw heated for heat-sealing, and has a rigid pressure surface. With regard to fibrous tube materials the thickness variations thereof are unavoidable owing to the presence of fibres in the material. The single-side plastic does not essentially change this condition. When two co-operating clamping jaws compress between them a tube of a single-side plastic coated material at least the plastic coating of which being simultaneously heated, the locally thicker portions of the zone to be compressed and sealed are subjected partly to a higher pressure, partly to heating for a longer time than the relatively thinner portions. At the thicker portions this will result in that the plastic coating is forced off toward the thinner portions, which are subjected to their pressure somewhat later than the thicker portions and furthermore are heated during a shorter period than the latter. The local forcing-off of the plastic will correspond to fine channels in the transverse joint, which may cause leakage in the finished packages.

The disadvantages of a rigid pressure surface in a counter-pressure jaw are still more evident in case the tube to be treated comprises a longitudinal joint in which the tube material occurs at least in double layers, as the thickness variations along the compressed zone in that case are no longer only microscopic.

The disadvantages mentioned above and other disadvantages in connection therewith are eliminated by the device according to the present invention, which is substantially characterized in that the pressure surface of the clamping jaw is resiliently deformable to obtain a controllable pressure distribution between all points along said pressure surface.

The invention will now be described more in detail with reference to the accompanying drawing in which an embodiment is shown as an example.

Fig. 1 illustrates, in a direction at right angles to the direction of operation, a counter-pressure jaw according to the invention, certain details of the jaw being cut away.

Fig. 3 is a partly sectional perspective view of an elastically deformable insert forming the pressure surface of the counter-pressure jaw shown in Figs. 1 and 2.

Fig. 4 is a fragmentary view in transverse section of the upper part of the counter-pressure jaw illustrating a modified construction.

Figure 2:
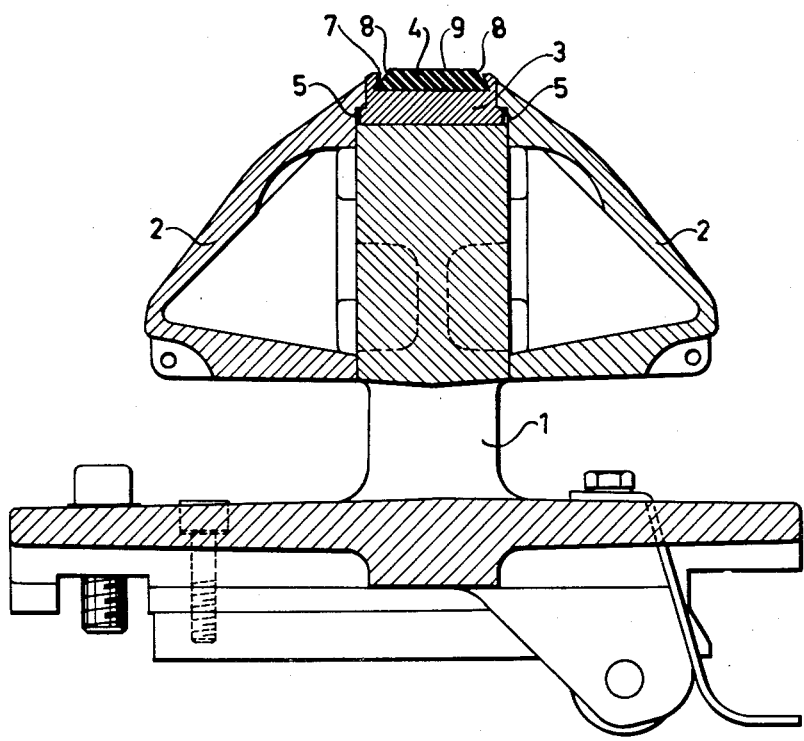
Fig. 2 is a cross section through the counter-pressure jaw shown in Fig. 1.

In the drawing, the invention is illustrated as applied to a counter-pressure jaw known per se, comprising a body 1 of substantially T-shaped side section, two jaw wings 2 for shaping the package wall, and a counter-pressure plate 3, 4 kept in engaging relationship to the free end edge of the web portion of the body 1 by said jaw wings 2. The counter-pressure plate 3,4 is of stepped cross-section, providing two longitudinal shoulders 5 received in complementary shouldered portions in the jaw wings 2 for fixing the counter-pressure plate 3, 4. In order to prevent the counter-pressure plate from lateral displacement along the web portion of the body 1, the latter may be provided with a recess to accommodate the counter-pressure plate 3, 4, or the jaw wings 2 may be adapted by shoulder-like portions 6 to overlap the jaw body 1 and engage the ends of the counter-pressure plate 3, 4.

According to the invention, the counter-pressure plate 3, 4 is resiliently deformable in the direction of operation in response to the operation pressure of the jaw. In the embodiment of the counter-pressure plate 3, 4, shown in the drawing, this feature is obtained owing to the fact that said counter-pressure plate comprises a substantially rigid body 3, and an elastically deformable insert 4, shown in Fig. 3, and being of the same longitudinal extension, said insert forming the operation surface of the counter-pressure jaw. The upper side of the body 3 of the counter-pressure plate is provided with a preferably dovetail-shaped groove 7 to receive the insert 4, for example of rubber or the like. The insert 4 is of a section corresponding to that of the dovetail groove 7 in order to be retained therein, its longitudinal sides 8, however, having flatter slope than the corresponding side walls of the groove 7, so that the insert 4, in its unloaded condition, will engage the side walls of the groove 7 only along the bottom of the groove 7. In loaded condition the insert 4 extends somewhat beyond the body 3 of the counter-pressure plate, so that its free upper side 9 will form the pressure surface proper of the counter-pressure plate 3, 4.

The shoulder-like portions 6 of the jaw wings 2, which, if desired, may be replaced by separate pieces, engage the respective ends of the counter-pressure plate 3, 4 at least along the whole active surface thereof, when the counter-pressure jaw is under pressure. They may extend beyond the upper side of the body 3 of the counter-pressure plate by a portion, the active height of which above the said upper side must be less than the thickness of the joint which is compressed between two jaws, in order to ensure complete compression of the joint, yet to leave, a narrow space or gap between two co-operating jaws, when idling.

When compressing a tube of single-side plastic coated paper or the like between a jaw provided with a counter-pressure plate 3, 4 according to the invention and another jaw with corresponding but substantially non-resilient pressure surface, for example a heated pressure jaw, the insert 4 will be elastically deformed in the space defined by the dovetail groove 7 and the shoulders 6, and during the very first stage of the compression its longitudinal side edges 8 will be brought into engagement with the side walls of the groove 7, while, during the continued compression it will bring about a pressure distribution along its operation surface 9 in such a manner that a local pressure variation at some point along the operation surface 9 is compensated for at other points thereof, whereby the insert 4 may be said to have "hydraulic" effect.

In order that a tube having a longitudinal joint of greater thickness than the tube wall be compressed without disadvantages between a pressure jaw with non-elastic pressure surface and a counter-pressure jaw according to the invention having an elastically deformable and controllably pressure-distributing operation surface, the counter-pressure plate, along that portion of its active longitudinal side edges corresponding to the longitudinal joint of the tube, may have another active cross-section than the rest of it, for example be bevelled. This involves that, in the embodiment in the drawing, the insert 4 and/or the body 3 of the counter-pressure plate 3, 4 have correspondingly bevelled portions 10 and 11 respectively along the edge portions so as to provide for localized pressure release of the corresponding portion of the pressure exerting face 9.

As apparent from Fig. 3 the insert 4 is substantially in the form of an elongated pad or bar of uniform thickness and of rubber or the like and is of trapezoidal configuration in transverse cross-section. For adjusting the active elasticity of the insert 4 locally along its length and/or its width, the insert 4 may have a local section correspondingly differing from the rectangle and the parallel trapezoid shape, respectively. The same local elasticity adjustment may be effected by suitably modifying the space defined by the groove 7 and the shoulders 6 in the point or points in question.

When during the compression of the tube there is simultaneously enclosed for example a liquid in the packages being formed, it is necessary to prevent the pressure surface 9 of the insert 4 from first engaging the outside of the tube by its longitudinal side edges in order to prevent a liquid quantity from being trapped in the transverse joint proper and thus from impairing same. To this end a longitudinal ridge 3a may be provided in the bottom of the dovetail groove, as shown in Fig. 4, said ridge causing a local increase of pressure along the corresponding portion of the pressure surface 9, so that the liquid in the transverse joint being formed is forced away therefrom.

The flatter slope of the side edges 8 of the insert 4 in relation to the side walls of the groove 7 will prevent a wear of the insertion 4 along the upper edges of the groove walls, and besides, it will ensure a better utilisation of the elastic properties of the insert 4.

What I claim is:

1. A counter-pressure jaw to effect sealing of a multilayer workpiece inserted between said jaw and a pressure jaw, said counter-pressure jaw comprising a jaw body of rigid material, said jaw body being provided with a dove-tail groove closed at both ends thereof, and a pad of elastic material seated in said groove and being of substantially the same length and width as said groove, the face of said pad constituting a yieldable pressure exerting face and the operative thickness of said pad when in a normal unloaded condition exceeding the depth of said groove, the sides of said pad confronting the sloping side walls of said dove-tail groove being sloped in the same direction as the side walls of said groove but being flatter than the latter thereby to reduce wear of said pad along the upper edges of the side walls of said groove.

2. A counter-pressure jaw as defined in claim 1 wherein the longitudinally extending edges of the upper face of said pad are bevelled along a predetermined portion thereof to effect a correspondingly positioned localized pressure release of said face.

3. A counter-pressure jaw as defined in claim 1 wherein said elastic pad is of substantially uniform thickness and said groove is provided with a longitudinally extending ridge to effect a localized pressure increase along the corresponding portion of the pressure-exerting face of said pad.

References Cited in the file of this patent

UNITED STATES PATENTS

| 1,259,218 | Eriksen | Mar. 12, 1918 |
| 2,390,550 | Moore | Dec. 11, 1945 |
| 2,574,094 | Fener et al. | Nov. 6, 1951 |
| 2,621,704 | Langer | Dec. 16, 1952 |
| 2,646,105 | Langer | July 21, 1953 |
| 2,725,091 | Miner | Nov. 29, 1955 |
| 2,835,778 | Proaps | May 20, 1958 |